(No Model.) 4 Sheets—Sheet 2.
D. A. ROBINSON.
POWER TRANSMISSION FOR GRAIN ELEVATORS.
No. 460,661. Patented Oct. 6, 1891.
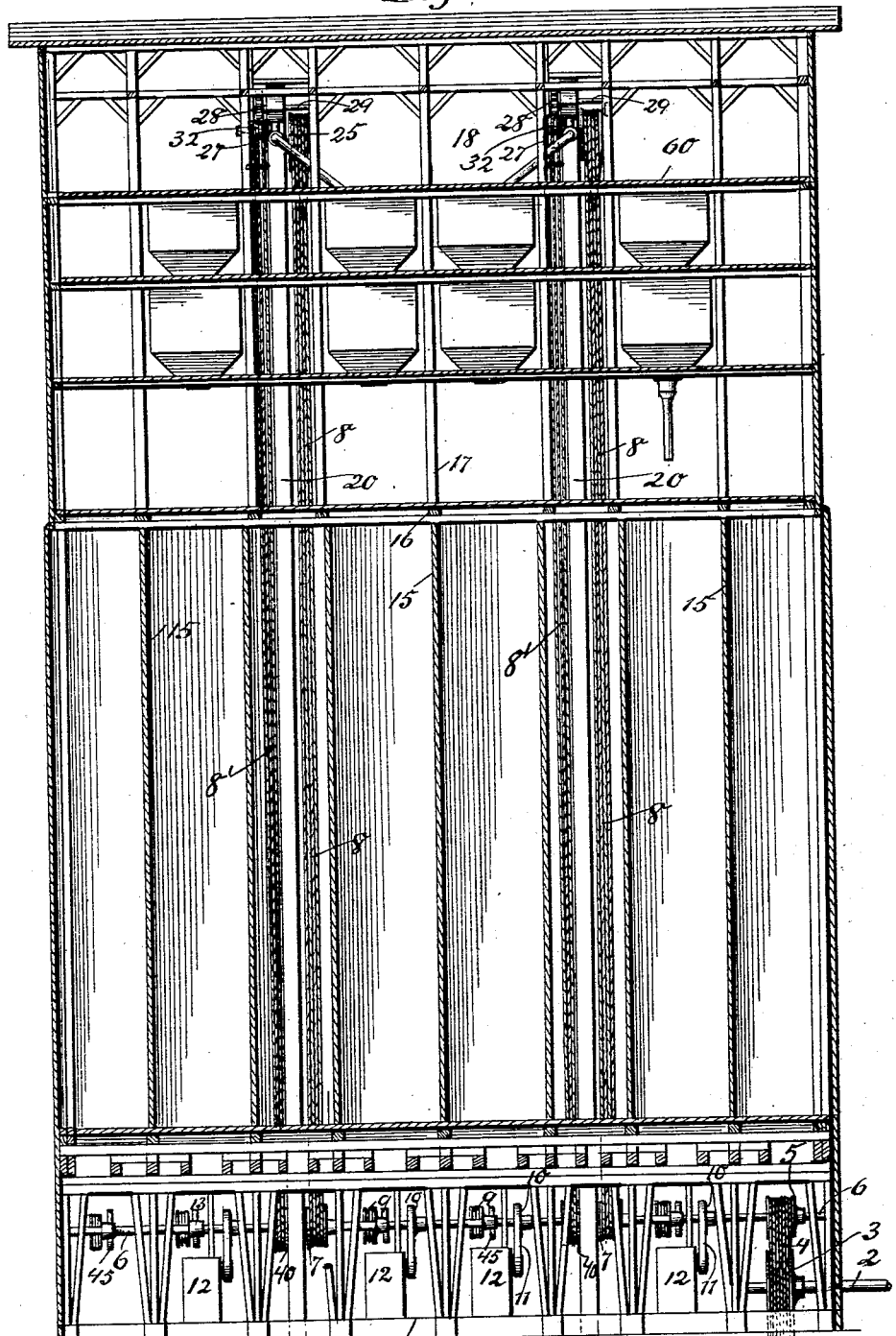

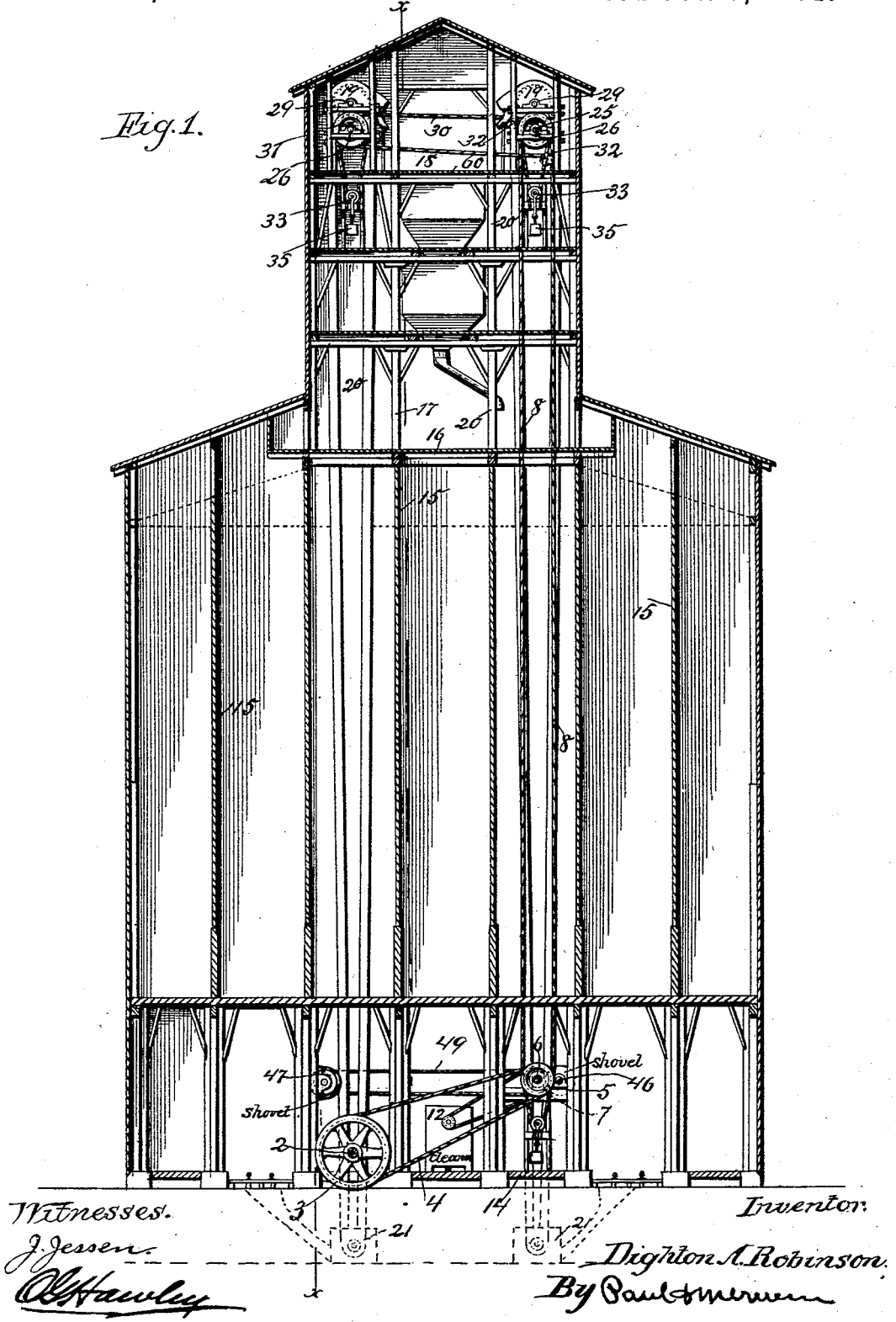

(No Model.) 4 Sheets—Sheet 3.
D. A. ROBINSON.
POWER TRANSMISSION FOR GRAIN ELEVATORS.
No. 460,661. Patented Oct. 6, 1891.
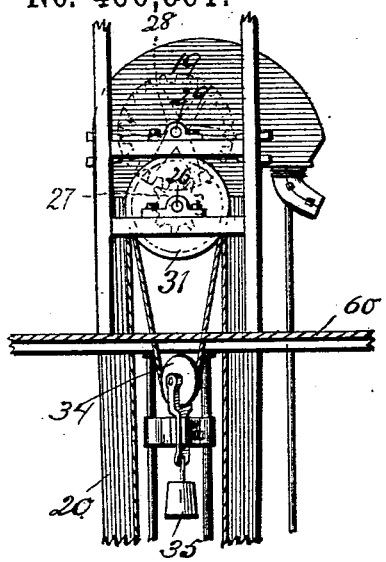
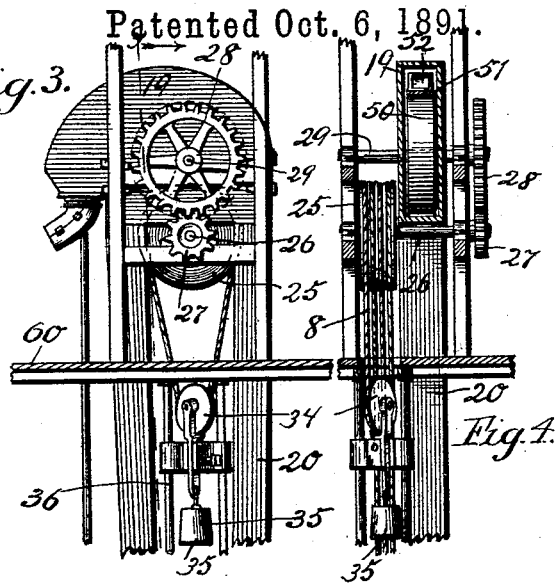
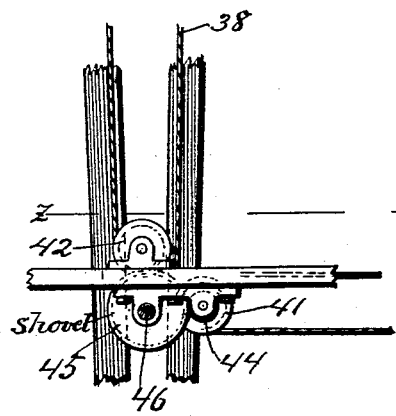
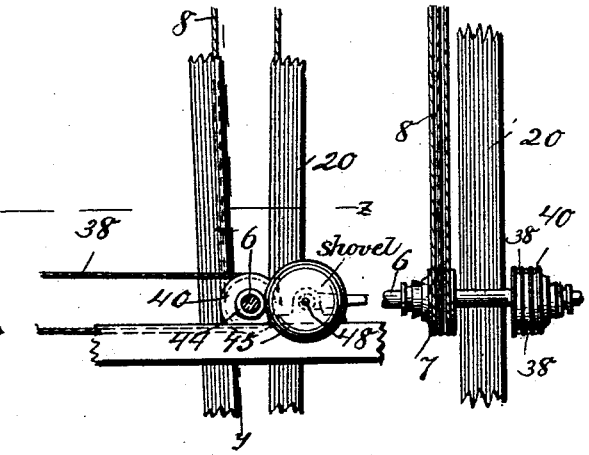
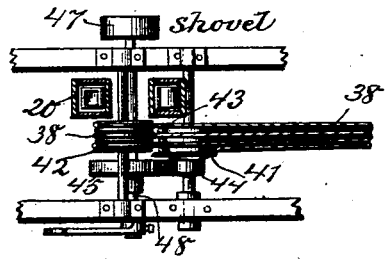
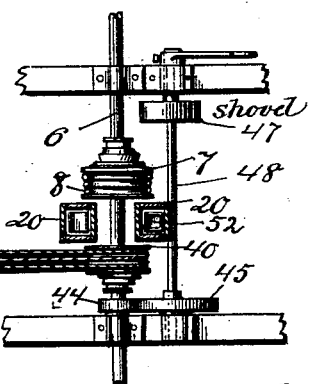
Witnesses.
J. Jensen
C. G. Hawley
Inventor:
Dighton A. Robinson
By Paul Sinnemann Attys.
THE NORRIS PETERS CO., PHOTO-LITHO., WASHINGTON, D. C.

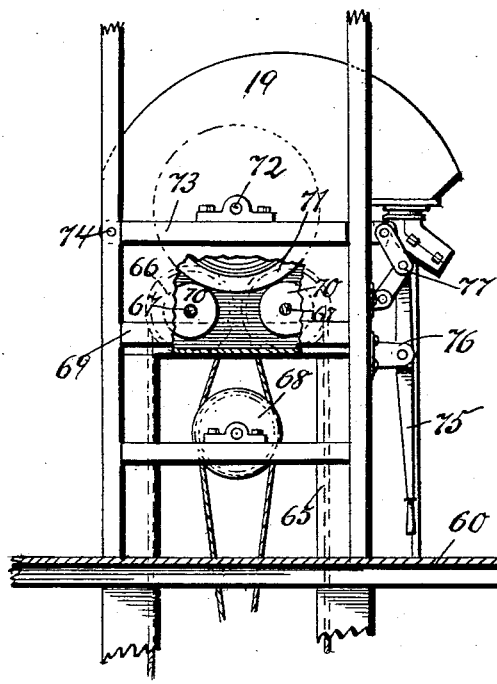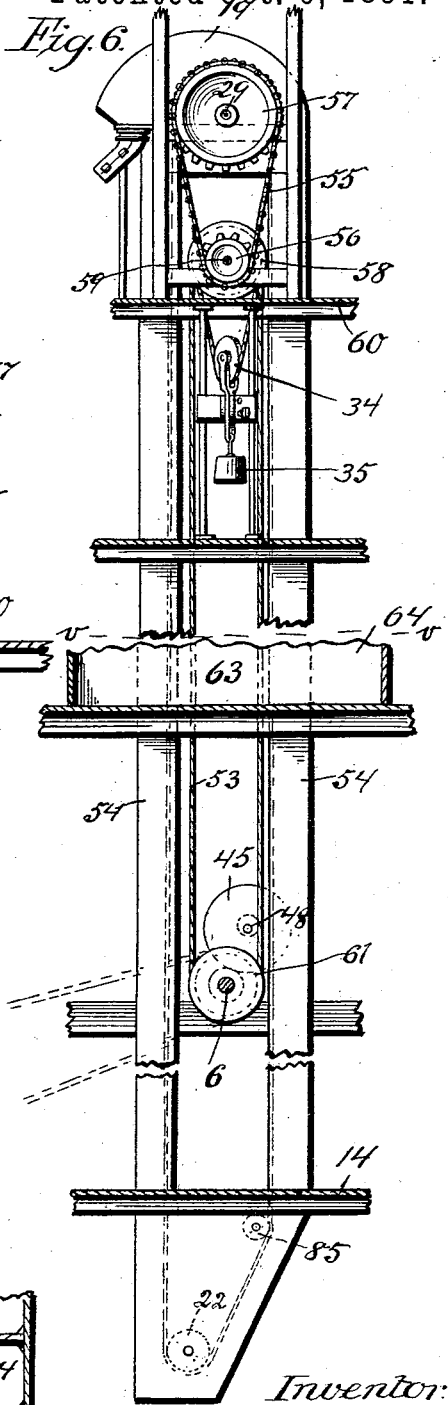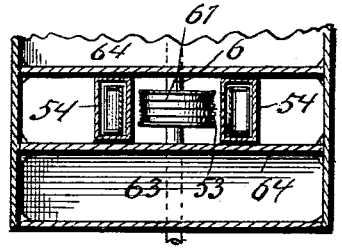

UNITED STATES PATENT OFFICE.

DIGHTON A. ROBINSON, OF MINNEAPOLIS, MINNESOTA, ASSIGNOR OF ONE-HALF TO JOHN SIMPSON, OF SAME PLACE.

POWER-TRANSMISSION FOR GRAIN-ELEVATORS.

SPECIFICATION forming part of Letters Patent No. 460,661, dated October 6, 1891.

Application filed March 26, 1891. Serial No. 386,535. (No model.)

*To all whom it may concern:*

Be it known that I, DIGHTON A. ROBINSON, of Minneapolis, in the county of Hennepin and State of Minnesota, have invented a certain Improved System of Power-Transmission for Grain-Elevators, of which the following is a specification.

My invention relates to means for conveniently, cheaply, and safely transmitting power to the various parts of an elevator-building.

Heretofore much trouble and expense have been caused by the use in the top of the elevator-cupola of long lines of shafting for driving the elevator-belts extending up from the bottom of the building. The power has ordinarily been transmitted to these long shafts by a main belt extending from a large drive-pulley on the engine-shaft. In order to make each elevator-belt independent of the others, friction pulleys or clutches have been used in connection with the long shafts in the cupola. For running the shovel-machines and the grain-cleaners on the lower floor of the elevator-building separate lines of shafting and belting have been provided in the lower part thereof. The disadvantages of such systems are, first, the impracticability of keeping in line the long shafts in the top of the building, owing to the settling and rocking of the same as the grain-bins are filled and emptied. This motion of the building thus makes necessary constant attention to and changes in the alignment of the cupola-shafts and of the counter-shafts connected therewith; second, great danger of fire in the upper part of the building, caused by sparks from the friction devices; third, the necessity for use of high bin-posts on which to set the cupola to give sufficient strength for the proper support of the heavy shafting, &c., and, fourth, the original high cost of construction and expense of maintenance.

The objects of my invention are to do away with the long lines of shafting in the cupola, to make the operation of each elevator-belt entirely independent of all others, to drive all of the machinery from one or main shafts in the bottom of the building, to do away with the necessity of using bin-posts, to prevent possibility of fire in parts of the building not readily accessible, and in general to decrease the cost of construction and of operation.

With these ends in view my invention consists, generally, in constructions and combinations hereinafter described, and particularly pointed out in the claims.

My invention will be more readily understood by reference to the accompanying drawings, in which—

Figure 1 is a transverse sectional elevation of an elevator-building provided with power-transmission devices embodying my invention. Fig. 2 is a longitudinal section of the same on the line X of Fig. 1. Fig. 3 is an enlarged view of the apparatus shown in Fig. 1, the same being modified and the intermediate portions between the top and bottom of the building being cut away. Fig. 4 is a sectional view on the line $y\ y$ of Fig. 3. Fig. 5 is a sectional plan view on the line $z\ z$ of Fig. 3. Fig. 6 shows another drive arrangement, the drive belt or ropes occupying the space between the elevator-cases. Fig. 7 is a sectional view on the line $v\ v$ of Fig. 6. Fig. 8 shows a friction-drive for revolving the elevator-belt pulley.

In Figs. 1 and 2 of the drawings, 2 represents the engine-shaft, and 3 the main drive-wheel. From this main wheel 3 the rope drive-belt passes over the grooved pulleys 5 on the main drive-shaft 6. This drive-shaft 6 extends the full length of the building, as shown, and is provided with the large pulleys 7, from which the long rope drives 8 extend up into the cupola of the building and over pulleys adapted to operate the elevator-belts. This long shaft is also provided with pulleys 9 for running the scoop-shovels used in unloading the grain from the cars; also located on this shaft 6 are drive-wheels 10, from which belts 11 extend to operate the grain-cleaners or other machines 12. All of these pulleys and wheels are connected with the drive-shaft 6 by suitable friction-clutches 13, adapted to be controlled by suitable shifting devices accessible from the lower floor 14 of the building. By throwing out the shipper-rods of these friction-clutches 13 any portion or all of the machinery of the building may be stopped. The cupola is built directly upon the top of the bin-planking 15, suitable girders being placed across the top thereof upon which to rest the lower ends of the cupola-timbers or frame-work 17. This cupola is provided with the usual weighing-bin and spout-floors and with the upper story 18, containing the machinery for driving the belt-pulleys in the heads 19 of the elevator-cases 20. The elevator-boots 21 (shown in dotted lines in Figs. 1 and 2 and in full lines in Fig. 6) are provided with suitable idlers 22, over which the conveyer-belts pass. Short counter-shafts are provided in connection with the elevator-heads, and a rope belt passes up over the same from a corresponding pulley 7 on the main shaft in the lower part of the building. The connection between the counter-shaft pulley and the elevator-belt pulley is positive, so that when the drive-belt 8 is started up by throwing in the friction-clutch on the shaft 6 the elevator-belt is immediately set in motion. In this way the control of the machinery from the first floor is made absolute. Ordinarily the friction-clutches have been located on the long shafts in the cupola and operated by wire ropes or halyards extending down to the lower floor.

As shown in Fig. 1, the rope drive 8 extends from the pulley 7 up to and over the counter-shaft pulley 25, secured on the short counter-shaft 26, which extends through between the legs of the elevator-case and just beneath the elevator-head 19.

Figs. 2 and 4 show one end of the counter-shaft 26, provided with the pulley 25, and on the other end, on the other side of the head, with the gear-pinion 27, which meshes with the large gear 28, provided on the shaft 29, to which the head-pulley with the head 19 is secured. Hence the head-pulley and the elevator-bucket belt passing over the same are driven when the rope drive 8, passing over the pulley 25, is started up. The elevator-head on the other side of the building is provided with gear-wheels and drive-pulley 31, similar to that just described. The drive-ropes, however, extend to the same in a different way. The drive 8' passes up from a second pulley 40, corresponding to the pulley 7. Passing over idlers 32, the ropes are carried in a loop 30 across the building and over the pulley 31. The idlers are so arranged that the upgoing and downgoing strands of the drive 8' interlace, as indicated in Fig. 2. These idlers are secured on short shafts fixed in bearings bolted to the frame-work of the building. In place of using separate drives from the top to the bottom of the building, the drive 8 may be made heavier and a short loop-belt extended between the pulley 31 and another provided on the counter-shaft 26. This belt, if used, should be twisted, so as to revolve the other elevator-belt in the proper direction. Suitable tension devices 33 are provided in connection with the ropes making up the drive 8 for taking up all slack therein. These tension devices are shown in detail in Figs. 3, 4, and 6, showing the outside strands of the rope passed down in a loop around the idler-sheave 34, provided with the weight 35 and held in place by guides.

Figs. 3 and 4 show apparatus identical with that shown in Figs. 1 and 2, with the exception of the arrangement of the driving-ropes. In place of using the long vertical drives 8 and 8' in one side of the building, or rather a number of such, I may use two vertical drives 8 and 38, the first operated from the drive-pulley 7 on the main shaft 6 and the other driven from a second drive 40 thereon, the ropes 38, corresponding to 8', being carried around the idlers 41 and 42 to change the running direction of the drive, so that the two elevator-belts will revolve in opposite directions. As shown in the plan view, Fig. 5, the upper strands of the rope 38 are held apart by a special arrangement of grooves in the idler 42, so that the lower strands may pass between the same, as shown by the rope ends 43, which are guided by grooves in the idler 41. A paper friction-wheel 44 is provided on the shaft of the idler 41, against which the larger friction-wheel 45 may be forced by throwing over the cam 46, thereby setting the drums for operating the shovels or other secondary machines in motion. This form of device for the two sides of the elevator I prefer over that shown in Figs. 1 and 2, for the reason that the ropes extending between the pulleys 40 and the idlers 41 and 42 in the bottom of the building can more easily be given close attention than the cross-belts forming the loops 30, (shown in Fig. 1,) and, further, for the reason that the short drives 49 from the pulleys on the shaft 6 for driving the shovels (shown in Fig. 1) are dispensed with. Fig. 4 shows the elevator head or belt pulley 50, over which the elevator-belt 51, having the cups 52, passes.

Figs. 6 and 7 show an arrangement for driving the head-pulleys 50 which I consider preferable to all others, for the reason that the drive-ropes 53, corresponding to the drive-ropes 8, are confined in the space between the elevator-cases 54, hence occupying no more room than must necessarily be used for the elevator-cases. This arrangement is made possible by the use of the sprocket-chain 55, running over the sprocket-wheels 56 and 57, the first of which is on the shaft bearing the upper drive-wheel pulley 58 and the second on the shaft with the elevator belt or head pulley. The sprocket-chain is long enough so that the shaft 59, which ordinarily bears the gear-pinion 27, may be dropped down, so as to leave room beneath the bottom of the elevator-head 19 for the drive-pulley 58. The shaft 59 is usually secured in bearings provided on the floor 60 of the upper story 18. The distance between the legs of the elevator-case is ordinarily from six to twelve feet, and hence there is plenty of space for the pulleys 61, corresponding to the pulleys 7, and for the pulleys 58 between the legs of the case.

These elevator-cases 54 are usually extended up through one of the grain-bins 63, and in order to prevent the pressure of the grain from throwing the cases out of line are protected by strong partitions 64, built on each side thereof, as shown in Fig. 7. Thus it will be seen that a space is left fully large enough to accommodate the necessary drive-ropes 53. A ladder usually extends through these wells midway between the legs 54 of the cases to render access to the drive-belts easy. By use of the small idler 85 (shown in dotted lines in Fig. 6) I am enabled to use a smaller boot-pulley than usual.

In Fig. 7 the drive-ropes 65 extend over pulleys 66 (shown in dotted lines) on the stationary shaft 67 and down over the tension-idler 68. The shafts 67 are provided with friction-pulleys 70 and are secured on the cross-beams 69 of the frame-work. The elevator-pulley 71, corresponding to the pulley 50, is mounted on a shaft secured in bearings 72, bolted on the movable frame-work 73, pivoted at 74 to the main stationary frame. By operating the lever 75, pivoted on the stationary block 76, the knuckle-joint levers 77 may be straightened to raise the pulley 71 out of contact with the friction-pulleys 70, and thereby stop the elevator-belt. By throwing back the lever 75 the large pulley may be dropped down upon the friction-pulleys, which, if in motion, will revolve the large pulley and the elevator-belt.

The principal objects of the invention are thus attained—namely, a head-drive for the elevator-belts and absolute control of machinery from below, low cost of building and operation, owing to the employment of the long shaft 6 in the lower part of the building, where it is not influenced by any twisting or rocking of the elevator-building, and, further, all friction-clutches being dispensed with in the top of the builing, danger of a destructive fire is practically avoided.

Having thus described my invention, I claim as new and desire to secure by Letters Patent—

1. The combination of the elevator-belts arranged on opposite sides of the building and head-pulleys thereof arranged on short shafts with another short shaft provided in connection with each of said head-pulleys, a main shaft provided in the lower part of the elevator-building, means for driving the same, and a belt extending up to and adapted to drive each of said second short shafts, substantially as described.

2. The combination, in an elevator, of a main driving-shaft provided in the lower part thereof with a series of loose pulleys provided thereon and adapted to be connected therewith by suitable clutch devices, elevator-belts, head and boot pulleys thereof, short counter-shafts connected with said head-pulleys, drive-pulleys thereon, and separate drive-belts extending from said pulleys on said main shaft over the corresponding drive-pulleys on the head-pulley counter-shafts, substantially as and for the purpose specified.

3. The combination of the main shaft located in the lower part of the building with elevator-belts located on opposite sides of the building and extending over head-pulleys provided on short shafts arranged in the cupola, other short shafts provided in connection with said head-pulleys, driving-pulleys thereon, corresponding driving-pulleys on said main shaft, and belts passing therefrom over said driving-pulleys in the cupola, and said driving-pulleys on the main shaft being connected therewith by suitable clutches, substantially as described.

4. The combination, in an elevator, of the main driving-shaft located in the lower part of the building with elevator-belts provided with means for raising the grain, head and boot pulleys for said belts, counter-shafts positively connected with said head-pulleys, and rope drive-belts extending from drive-pulleys on said shaft over drive-pulleys on said counter-shafts, substantially as and for the purpose specified.

5. The combination of a main shaft located in the lower part of the building and extending the length thereof with elevator, secondary machine, drive-pulleys thereon, said elevator drive-pulleys being connected with said main shaft by suitable clutches, the storage-bins, the cupola built directly on the tops thereof, the elevator-belts, the head-pulleys located in the top of the cupola, counter-shafts connected with said head-pulleys, rope driving-belts extending from the drive-pulleys on the main shaft over drive-pulleys on said counter-shafts, and tension devices provided in connection with said rope driving-belts, substantially as described.

6. The combination, with the main shaft located in the lower part of the building, of elevator-belts located on opposite sides of the building, boot and head pulleys therefor, counter-shafts provided in connection with said head-pulleys, driving-pulleys thereon, driving-pulleys on said main shaft, and rope drives extending therefrom over said driving-pulleys on said counter-shafts, the vertical drive-belts in the side of the building opposite the main shaft being connected therewith by cross connections or loops 38, and said pulleys on said main shaft being connected therewith by suitable clutches, substantially as and for the purpose specified.

7. The combination, with an elevator-belt, of boot and head pulleys therefor, the elevator-casings 54, the main drive-shaft, the drive-pulleys 61 thereon, provided between said cases, the counter-shafts 59, the small sprocket 56 and the drive-pulley 58, secured thereon, the sprocket-wheel 57, secured upon the shaft of the head-pulley, and the sprocket-chain 55, substantially as and for the purpose specified.

8. The combination, with the elevator-belt, of head and boot pulleys therefor, elevator-casings 54, the drive-pulleys 58 and 61, secured on the shaft 59 and the main shaft 6, respectively, the rope drive passing over the same and included between said elevator-casings, the sprocket-wheels, and sprocket-chains connecting the same and adapted to drive the said head-pulleys, substantially as described.

9. The combination, with an elevator-belt, of the head-pulley therefor and the short shaft whereon said head-pulley is arranged, casings for said belt, the short shaft arranged beneath said head-pulley shaft and between the legs of said casings, the drive-pulley arranged thereon, a main shaft, a drive-pulley thereon, the drive-belt passing over said drive-pulleys, and a drive connection provided between said short shafts, substantially as described.

10. The combination of a main shaft arranged in the lower part of the building with the elevator-belts located in different transverse positions with respect to said main shaft, head-pulleys for said belt arranged on short shafts, other short shafts provided in proximity thereto, drive connections between respective pairs of short shafts, and means for driving said other short shafts from said main shaft, substantially as described.

11. The combination, with a main shaft arranged in the lower part of the building, of elevator-belts located on opposite sides of the head-pulley shafts, head-pulleys therefor, short counter-shafts having driving-pulleys and connected therewith, corresponding driving-pulleys on said main shaft and adapted to be connected therewith by clutches, rope belts passing from thence over the first-mentioned driving-pulley, secondary machine-drums, and means for connecting the same with said main shaft at will, substantially as described.

In testimony whereof I have set my hand this 18th day of March, 1891.

DIGHTON A. ROBINSON.

In presence of—
C. E. VAN DOREN,
FRED S. LYON.